United States Patent
Blair et al.

(10) Patent No.: US 7,693,136 B1
(45) Date of Patent: Apr. 6, 2010

(54) REVERTING TO ANALOG SERVICE FROM IP PHONE

(75) Inventors: Colin Blair, Westleigh (AU); Kevin Chan, Ryde (AU); Andrew W. Lang, Epping (AU); Christopher Reon Gentle, Gladesville (AU); Neil Hepworth, Artarmon (AU)

(73) Assignee: Avaya Inc., Basking Ridge, NJ (US)

( * ) Notice: Subject to any disclaimer, the term of this patent is extended or adjusted under 35 U.S.C. 154(b) by 686 days.

(21) Appl. No.: 11/391,870

(22) Filed: Mar. 28, 2006

(51) Int. Cl.
*H04L 12/26* (2006.01)
*H04J 1/16* (2006.01)
*G08C 15/00* (2006.01)
*G06F 11/00* (2006.01)
*G01R 31/08* (2006.01)

(52) U.S. Cl. .................. 370/352; 370/241; 370/338; 379/93.06; 709/239

(58) Field of Classification Search ......... 370/328–338, 370/352–386, 401–467, 259–286; 709/203–245; 379/88–93
See application file for complete search history.

(56) References Cited

U.S. PATENT DOCUMENTS

| | | | | |
|---|---|---|---|---|
| 6,301,340 B1 * | 10/2001 | Sansom et al. | ........... | 379/93.06 |
| 6,700,956 B2 * | 3/2004 | Chang et al. | ........... | 379/93.09 |
| 6,781,983 B1 * | 8/2004 | Armistead | ........... | 370/353 |
| 6,868,139 B2 | 3/2005 | Stumer et al. | | |
| 6,931,001 B2 * | 8/2005 | Deng | ........... | 370/352 |
| 7,212,520 B2 * | 5/2007 | Luciano, III | ........... | 370/352 |
| 7,336,649 B1 * | 2/2008 | Huang | ........... | 370/352 |
| 7,408,923 B1 * | 8/2008 | Khan et al. | ........... | 370/352 |
| 7,436,819 B2 * | 10/2008 | Ezumi | ........... | 370/352 |
| 2001/0012282 A1 * | 8/2001 | Yegoshin | ........... | 370/338 |
| 2002/0089975 A1 * | 7/2002 | Vaziri et al. | ........... | 370/352 |
| 2002/0090962 A1 * | 7/2002 | Struhsaker et al. | ........... | 455/462 |
| 2002/0122417 A1 * | 9/2002 | Miller et al. | ........... | 370/352 |
| 2003/0053446 A1 * | 3/2003 | Kwon | ........... | 370/352 |
| 2003/0093563 A1 | 5/2003 | Young et al. | | |
| 2003/0145108 A1 * | 7/2003 | Joseph et al. | ........... | 709/239 |
| 2003/0152066 A1 * | 8/2003 | Luciano, III | ........... | 370/352 |
| 2003/0194060 A1 | 10/2003 | Stumer et al. | | |
| 2004/0136398 A1 | 7/2004 | Enzmann et al. | | |
| 2006/0039290 A1 * | 2/2006 | Roden et al. | ........... | 370/241 |
| 2006/0067302 A1 * | 3/2006 | Wengrovitz et al. | ........... | 370/352 |
| 2006/0153108 A1 * | 7/2006 | Nakajima | ........... | 370/286 |
| 2007/0147342 A1 * | 6/2007 | Piercy et al. | ........... | 370/352 |

OTHER PUBLICATIONS

*NEC Univerge IP Phones*, Product Features Guide, NEC Corporation, 2004, 4 pages.

* cited by examiner

*Primary Examiner*—Man Phan
(74) *Attorney, Agent, or Firm*—Sheridan Ross P.C.

(57) ABSTRACT

The present invention is directed toward a method, device, and system for use during a network failure. The invention provides a telecommunication device that may be circuit-switched and packet-switched enabled. In a first mode of operation the telecommunication device is operable to communicate via a packet-switched network and in a second more of operation the telecommunication device is operable to communicate via a circuit-switched network.

26 Claims, 4 Drawing Sheets

REVERTING TO ANALOG SERVICE FROM IP PHONE

FIELD

The invention relates generally to the field of telecommunication devices. More specifically, the present invention provides an enhanced telecommunication device and corresponding network devices that allow the telecommunication device to operate during network failures.

BACKGROUND

There are two basic technologies presently used in telephony, digital and analog. For many years analog phones have been a standard communication device in households and businesses across the world. The analog phone operates by transmitting a continuous (analog) electronic representation of a person's voice signal across a communication network to another endpoint that is also connected to the network. Analog phones are connected to the phone company's office with a pair of copper wires, which supply power to the phone, and carry voice signals to/from the phone. Generally, power supplied by analog telephone lines is a more reliable source of power than typical power lines. This is because power lines utilize higher voltage and current than analog telephone lines do, and as a result power lines are much more interconnected than analog telephone lines. Because power lines are more interconnected than typical analog telephone lines, a power outage in one portion of the power grid may result in a power failure in another portion of the power grid.

Digital phones, examples of which include a Voice over IP (VoIP) phones and Digital Control Protocol (DCP) phones, on the other hand have been developed to transmit a digital representation of a person's voice signal across a communication network to another endpoint that is also connected to the network. Advantages offered by digital phones over analog phones include an increased signal processing speed and a reduced amount of noise present on the digital lines when compared to analog lines. Since there is less noise, digital phones are able to transmit data at much higher rates at much better quality levels than their analog counterparts.

However, many digital phones, particularly VoIP or IP phones, have the drawback that they may not continue to operate during a power failure. Some of the first models of IP phones required either a local power supply or were supplied power through the national power grid. In other words, the IP phones were just plugged into outlets of a wall (e.g., 120V, 60 Hz outlets in the United States or 230V, 50 Hz outlets in Australia and Europe). The downside to using phones that are connected to the national power grid is that they are susceptible to failure as the power grid fails. Since most power lines are exposed to the elements instead of being buried underground, the likelihood of power failures in parts of the national power grid is relatively high. More recently, however, Power over Ethernet (PoE) has been used to transmit electrical power, along with data, to a remote device over a standard twisted-pair cable in an Ethernet network. PoE may be used to power telephones, wireless Local Area Network (LAN) access points, webcams, Ethernet hubs, computers, and other appliances with direct current (DC) provided through the Ethernet cable where a separate power supply would be inconvenient and/or infeasible. However, in most PoE scenarios, DC power is supplied to an IP phone from the Ethernet switch connected to the phone. In another PoE scenario, power is supplied from devices located between the Ethernet switch and the device being powered. One downside to utilizing a DC power source is that the range of the power transmission is limited. Usually, if the power fails in the area of the IP phone(s), odds are the power has also failed at the source of the DC power. Uninterruptible Power Supplies (UPS) may be used as a backup in case the power fails, but in the event of a prolonged power failure, the UPS may run out of energy for supplying power to the phone(s). Furthermore, IP phones require relatively more power than do their analog and digital non-IP counterparts. Thus, even though IP phones offer many benefits when compared to analog and digital non-IP phones, they still do not have the advantage of being powered by the phone company. IP phones suffer from a dependence upon two services, whereas analog phones are reliant only on one service. IP phones are susceptible to communication failures if either one of the communication network or the power supply fails. Thus, IP phones have two points of failure, whereas analog phones only have a single point of failure because the same line provides both the power and the communications to the analog phone.

One particular concern is that during a power failure, individuals may need to make an emergency call. In the event that the only type of phone they have available is an IP phone, and the power to the IP phone has been interrupted, then it may not be possible to make such an emergency call. Also, if the power fails, the user will most likely require a separate analog phone if they wish to make any calls. Their backup analog phones may not easily be located during a power failure due to decreased lighting. In some emergencies, such as those requiring Cardiac Pulmonary Resuscitation (CPR) to be administered, there may be no time or opportunity to search for and/or use a designated analog phone. Generally, users do not keep an IP phone and an analog phone available for use side-by-side because doing so would-take up-valuable desk space. In fact, most phone users purchase an IP phone to replace their analog phone, but as discussed above, the IP phone has drawbacks that traditional analog phones do not. The dependence of IP phones upon power supplies that are not as reliable as power supplies of analog phones is a major drawback of current IP phones.

There have been some attempts to create a hybrid-IP phone such that the IP phone can be used during network outages. Specifically, NEC™ has developed an IP phone that is powered by PoE and has optional adapters that can expand the capability of the phone. Adapters can be added to the IP phone such that the phone has a backup PSTN circuit that provides incoming and outgoing call capabilities. However, these IP phones typically use two ports, one for connecting to a circuit-switched network and the other for connecting to the packet-switched network. The additional ports and cables required to provide the switching feature for most of these IP phones are cumbersome in that the additional wires clutter a desktop. Furthermore, these additional ports and cables must be installed and connected through the walls, tracked, and connected to a router. The additional ports and cables result in additional costs and points of potential failure to the phone.

SUMMARY

These and other needs are addressed by the various embodiments and configurations of the present invention. The present invention is directed generally to a hybrid telecommunication device that provides for communication with a packet and circuit-switched network.

In accordance with one embodiment of the present invention, a method is provided for maintaining communication capabilities, especially during network failures. The method comprises:

connecting a first port of a telecommunication device to a packet-switched communication network;

while the first port is connected to the packet-switched network, operating the telecommunication device in a first operational mode;

upon the occurrence of a first event, connecting the first port of the telecommunication device to a circuit-switched communication network; and while the first port is connected to the circuit-switched network, operating the telecommunication device in a second operational mode.

Any condition or state triggering an operational mode switch from the digital to analog operating modes is herein referred to as a "first event." Typical examples of a first event include, but are not limited to, a power failure, a network failure, network congestion or a network not meeting certain Quality of Service (QoS) standards, a malfunctioning component of a network, and the like.

In the first operational mode the telecommunication device utilizes digital signal processing components for communicating with other communication devices via the packet-switched network.

In the second operation mode the telecommunication device may utilize analog components for communicating with other communication devices via the circuit-switched network. Additionally, the telecommunication device may utilize digital components and still communicate via the circuit-switched network. This is especially useful in the event that the first event corresponds to a network failure or some other defect in the packet-switched network. In this case, the telecommunication device can still utilize digital components and maintain some of the advantages associated with using digital components instead of analog components. However, if the first event corresponds to a power failure or some other event that affects the amount of power supplied to the telecommunication device, then the telecommunication device can switch to using analog components that typically use less power than digital components. This way, the telecommunication device can operate with minimal power requirements and receive power from a central communications service provider rather than a local power supply.

In accordance with at least some embodiments of the present invention, the port/interface used to connect the telecommunication device to the packet-switched network is the same port/interface used to connect the telecommunication device to the circuit-switched network. The port/interface may comprise an Ethernet port that is connected to an Ethernet cable. The Ethernet cable provides for communication via the packet-switched network in the first operational mode. In the second operational mode the telecommunication device may be connected to the circuit-switched network by choosing one or more wires from the Ethernet cable to send/receive signals over. The Ethernet cable may be equipped with an additional copper line for powering the telecommunication device in the event of the primary power failure. This allows the telecommunication device to operate in two distinct modes utilizing the same communication path to connect to two different types of networks. Thus, the telecommunication device can utilize an internal switch to change from one operational mode to the other and no additional wires or ports are required to make this possible.

The telecommunication device is typically connected to a routing device that provides for switching connections between the packet-switched and the circuit-switched networks. The routing device usually needs to switch connections when the telecommunication device switches connections such that the telecommunication device can operate in the second operational mode. In some instances, the first event may correspond to a power failure, and if this is the case then the switching of the routing device and the telecommunication device is generally coordinated at the instant the power supplied to each fails. However, if the first event corresponds to a network failure or some other type of failure that does not automatically coordinate the switching of both devices, then the telecommunication device (or the routing device) may need to communicate with the other device to coordinate such a switch of operational modes. A message sent from one device to the other indicating that a switch in operational modes is required may effect this coordination. When the receiving device receives the message it knows that the other device has detected a network failure or malfunction and thus knows that it desires to switch operational modes. Thus, both devices can then switch their respective connections and the telecommunication device can be connected to the alternative network.

If the telecommunication device is active in the second operational mode, meaning that it is currently engaging in a call over the circuit-switched network, and a second event occurs that would usually have the telecommunication device switch back to the first operational mode, the routing device may detect that the telecommunication device is currently active in a call and thus may allow the call to be completed before the operational mode is switched from the second back to the first operational mode. Thus, no calls are lost as a result of switching operational modes during a call.

The second event may be the removal of the first event or its consequences, such an event may include a resolution of the power supply failure, the resolution of the network failure or malfunction, and/or a repair of the failed componentry in the telecommunication device.

In accordance with still another embodiment of the present invention, the telecommunication device is operable to receive calls, either in packet or circuit-switched form, from outside telecommunication devices in both operational modes. When the routing device receives circuit-switched calls for telecommunication devices connected thereto and the telecommunication devices are operating in the second operational mode, the routing device may simply forward those calls onto the corresponding telecommunication device. When the routing device receives packet-switched calls for telecommunication devices connected thereto, the routing device may depacketize the received signals and forward a non-packetized call to the corresponding telecommunication device.

Sometimes, in an attempt to conserve power consumption or due to network bandwidth, multiple communication devices may be connected to a common circuit-switched line via the routing device. If this is the case, then the routing device may send a received call to one of the multiple communication devices. Generally, the designated telecommunication device for receiving calls sent to other telecommunication devices is centrally located such that users of the other telecommunication devices can easily access the designated telecommunication device.

These and other advantages will be apparent from the disclosure of the invention(s) contained herein. The above-described embodiments and configurations are neither complete nor exhaustive. As will be appreciated, other embodiments of the invention are possible utilizing, alone or in combination, one or more of the features set forth above or described in detail below.

As used herein, "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

DETAILED DESCRIPTION

Figure 1:
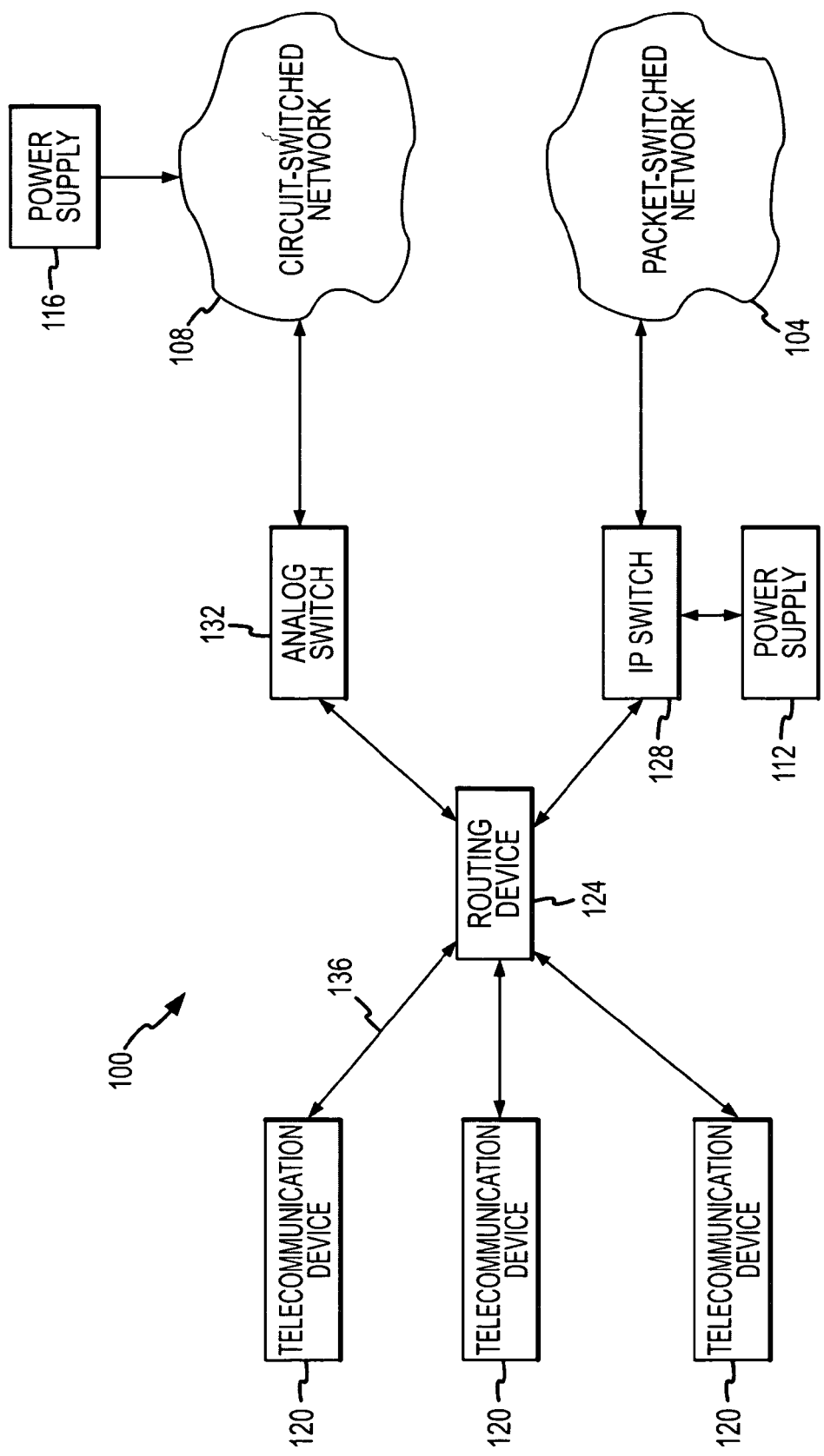
FIG. 1 is a block diagram depicting a communication network in accordance with least some embodiments of the present invention.

The invention will be illustrated below in conjunction with an exemplary communication system. Although well suited for use with, e.g., a system using routers and switches, the invention is not limited to use with any particular type of communication system or configuration of system elements. Those skilled in the art will recognize that the disclosed techniques may be used in any communication application in which it is desirable to have a hybrid communication device, Referring initially to FIG. 1, an exemplary communication system 100 will be described in accordance with at least some embodiments of the present invention. The communication system 100 generally comprises a packet-switched network 104, a circuit-switched network 108, a first power supply 112, a second power supply 116, a plurality of telecommunication devices 120, a routing device 124, an IP switch 128, and an analog switch 132.

The packet-switched network 104 can be any data and/or distributed processing network, such as the Internet or an enterprise network. The packet-switched network 104 typically includes proxies, registrars, and routers for managing packet flows.

The circuit-switched network 108 may be in the form of a Publicly Switched Telephone Network (PSTN) or similar type of circuit-switched network.

At least one of the plurality of telecommunication devices 120 comprises a hybrid telecommunication device. In other words, one of the telecommunication devices 120 may be designed to communicate via the packet-switched network 104 and the circuit-switched network 108 with other communication devices. In a first operational mode, a hybrid telecommunication device 120 acts as an IP phone and communicates with other communication devices via the packet-switched network. The telecommunication device 120 uses internal digital processing circuitry to send signal packets, through the routing device 124, to the IP switch 128. The IP switch 128 determines the destination(s) of the signals generated at the originating telecommunication device 120 and directs the signals to the determined destination(s) through the packet-switched network 104. Digital features used by the hybrid telecommunication device 120 in the first operational mode may include functions available in, for example, IP hardphones such as the Avaya Inc.'s 4600 Series IP Phones™, IP softphones such as Avaya Inc.'s IP Softphone™, Personal Digital Assistants or PDAs, Personal Computers or PCs, laptops, packet-based H.320 video phones and conferencing units, packet-based voice messaging and Interactive Voice Response (IVRs), and packet-based traditional computer telephony adjuncts.

In a second operational mode, a hybrid telecommunication device 120 acts as an analog phone, or any other type of traditional circuit-switched communication device. The telecommunication device, when operating in the second operational mode, transmits analog signals through the routing device 124 to the analog switch 132. The analog switch 132 is operable to determine the destination(s) of the analog signal and direct the signal to the determined destination(s) via the circuit-switched network 108 (which in one configuration uses at least some of the signal transmission paths as the packet-switched network). Analog features used by the hybrid telecommunication device 120 in the second operational mode may include functions available in, for example, wired and wireless Plain Old Telephone Service (POTS) phones, PDAs, H.320 video phones and conferencing units, voice messaging and response units, and traditional computer telephony adjuncts.

The switches 128 and 132 may be a part of an enterprise network. The term "switch" as used herein should be understood to include a PBX, an ACD, an enterprise switch/media server, an IVR switch/server, or other type of communications system switch/server, as well as other types of processor-based communication control devices such as media servers, computers, adjuncts, etc.

In the first operational mode, the hybrid telecommunication device 120 receives power from the power supply 112. Generally, the power is supplied to the telecommunication device 120 via Power over Ethernet (PoE), which has been standardized in IEEE 802.3af. The power to the telecommunication device is typically supplied in the form of DC power through a twisted-pair cable in the Ethernet network. In most circumstances, the power supply 112 is associated with a network device, like the switch 128, that is separate from the telecommunication device 120.

In the second operational mode, the hybrid telecommunication device 120 receives power from the power supply 116. Generally, the power is supplied to the telecommunication device 120 through a copper power line that is usually in the same cable as the data transmission line. The power supply 116 is generally associated with (or on the premises of) a phone service provider or similar entity. The copper line may be implemented as one of the leads of the Ethernet cable. Alternatively, the copper line may be an additional line that is a part of, i.e. connected to, the Ethernet cable but is not one of the leads in the Ethernet cable.

The hybrid telecommunication device 120, in accordance with at least some embodiments of the present invention, does not require separate ports and separate lines to function in the first and second operational modes. Instead of requiring an analog line with an analog port and a digital line with a separate digital port, the same communication line 136 and port may be used by the telecommunication device 120 when it is operating in the analog mode or the digital mode. The communication line 136 may comprise an Ethernet cable with a copper power line as is used in traditional analog lines. The communication line 136 is used like a normal Ethernet cable by the telecommunication device 120 in the digital mode of operation. Alternatively, in the analog mode of operation, the telecommunication device 120 may send data over one of the lines in the Ethernet cable to the routing device 124 where it is directed to the analog switch 132, rather than the IP switch 128. The use of a single communication line 136 is advantageous in that additional clutter associated with running a dedicated analog line to a telecommunication device 120 may be precluded.

It should be emphasized that the configuration of the switch/server 128 and 132, telecommunication devices 120, and other elements as shown in FIG. 1 is for purposes of illustration only and should not be construed as limiting the invention to any particular arrangement of elements. For example, the routing device 124 may be separated from the switch(es) 128 and 132 as shown in FIG. 1. However, an alternative configuration could be realized where the routing device 124 and the switch(es) 128 and 132 may exist within the same modular structure.

Figure 2:
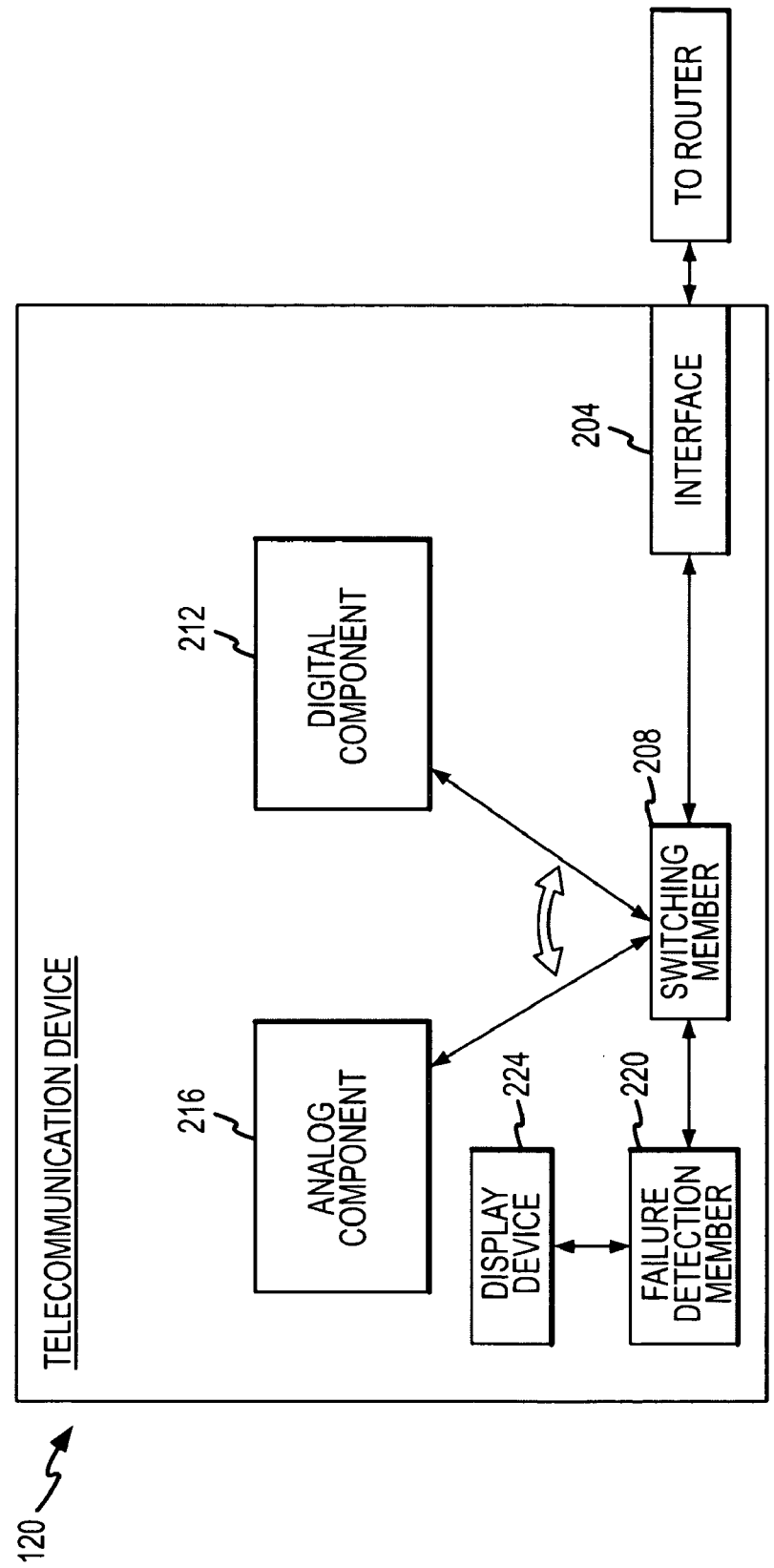
FIG. 2 is a block diagram depicting a telecommunication device in accordance with at least some embodiments of the present invention.

Referring now to FIG. 2, an exemplary telecommunication device 120 will be discussed in accordance with at least some embodiments of the present invention. The telecommunication device 120 may comprise, an interface 204, which is an example of a port, for transmission and reception of signals to/from either the packet-switched network 104 or the circuit-switched network 108, a switching member 208, a digital component 212, an analog component 216, a failure detection member 220, and a display device 224. The switching member 208 is operable to switch the operating mode of the telecommunication device 120 by connecting either the digital component 212 or the analog component 216 to the interface 204.

Generally, in the default operating mode, the digital component 212 is connected to the interface 204 via the switching member 208. The interface 204 is generally a communications port like an Ethernet, USB, or other type of port for connecting to a cable that in turn provides communication with other communication devices connected to the network(s) 104 and 108.

The telecommunication device 120 operates much like an IP telephone in the default first operating mode. In the first operating mode the telecommunication device 120 utilizes a microphone to send/receive signals to/from a user of the device 120, a processor, typically a Digital Signal Processor (DSP), for preparing the contents of a signal either for distribution across the packet-switched network 104 or for transmission to a user of the device 120, a packetizer for packetizing signals (e.g., dividing a signal into packets of information) for transmission across the packet-switched network 104 or for depacketizing signals (e.g., reconstructing packets of information to form the original signal) received from the packet-switched network, and a display (e.g., an LCD display or set of LED's) for displaying contents of a message to a user of the device 120.

The digital component 212 operating in the first operating mode is typically powered by PoE received at the interface 204 from the communication line 136. Of course the telecommunication device 120 may be plugged directly into an outlet and is receiving power from the power grid. In the event that the default power supply fails (e.g., the PoE becomes disconnected or fails or there is a power outage in the power grid), the switching member 208 switches the connection of the interface 204 to the analog component 216 of the telecommunication device 120. The power supplied to the analog component 216 is also received over the communication line 136 at the interface 204, but the source of that power is different from the original source of power that was running the digital component 212. For example, the source of power in the second operating mode may be power supplied by a service provider over a copper line.

The analog component 216 in the second operating mode is operable to use many of the same features used by the telecommunication device 120 during the first operating mode. In other words, in the second operating mode the receiver and the user display are employed while the analog component 216 is used instead of the digital component 212. However, the DSP and the packetizer are no longer used. Instead, analog signals are transmitted/received to/from the circuit-switched network 108. The other component still used by the telecommunication device 120 in the second operating mode is the interface 204 (e.g., an Ethernet port that is connected to an Ethernet cable) that was used to transmit/receive signals during the first operating mode. Typically, one line from an Ethernet cable is used to transmit/receive analog signals to the circuit-switched network 108. Essentially, the telecommunication device 120 is operating through the circuit-switched network 108 using the interface 204 that is also used to communicate with the packet-switched network.

The failure detection member 220 may also detect network failures other than power outages. Examples of other network failures that may require the telecommunication device 120 to switch from a first operational mode to a second operational mode include, but are not limited to, inoperable switches, malfunctioning routing devices, severed or otherwise malfunctioning communication links, no keep alive signals are being received, a malfunctioning digital component 212, and so on. The failure detection member 220 may detect a network failure, like no keep alive signals are being received, and determine that the telecommunication device 120 should switch from the first operating mode to the second operating mode (e.g., from digital mode to analog mode). Any condition or state triggering an operational mode switch from the digital to analog operating modes is herein referred to as a "first event." The first event typically triggers the telecommunication device 120 to switch from using the digital component 212 to using the analog component 216 therefore transforming the telecommunication device 120 to a circuit-switch enabled device.

Before the telecommunication device 120 can properly function in the second operating mode, it will send a message to the routing device 124 notifying the routing device 124 that a switch of operating modes is requested. The routing device 124 can process this message and flip a relay that allows the telecommunication device 120 to connect to the circuit-switched network 108 instead of the packet-switched network 104. Then a message can be sent back to the telecommunication device 120 that activates the switching member 208 to switch the telecommunication device 120 to connect the analog component 216 to the interface 204 instead of the digital component 212. Alternatively, the switching member 208 may connect the analog component 216 to the interface 204 when the failure is detected instead of waiting for confirmation from the routing device 124. However, communication between the telecommunication device 120 and the routing device 124 may not be necessary during a power failure in order to synchronize an operational mode switch because the operational mode of each is changed in response to a power failure. In most cases, in the first operational mode, the telecommunication device 120 is receiving power from the same source that the routing device 124 is receiving power from, or at least both are associated with the same power source. Thus, when that common power source fails, both the telecommunication device 120 and the routing device 124 know that the operational mode needs to be switched in order to preserve communication capabilities and no messages need to be sent between the devices.

As can be appreciated by one of skill in the art, the default operational mode may actually be the analog mode and in the event of a network or power failure, the operational mode may be switched to a digital operating mode.

When the telecommunication device 120 has switched operational modes it may be advantageous to display such an occurrence to a user of the device 120. The telecommunication device 120 may be equipped with a display device 224 that can indicate to a user of the telecommunication device 120 that the operational mode is different from the default operational mode. The display device 224 may be a simple LED, buzzer, or more sophisticated LCD. In one embodiment, the display device 224 is a LED that flashes in a certain pattern to indicate that the operational mode of the telecommunication device 120 has been changed. In another embodiment, the display device 224 is an LCD that displays "Power-Out-Analog." An indication that the telecommunication device 120 is operating in its default mode may also be presented to the user. However, the user will typically know that the telecommunication device 120 is operating in the default-operating mode because the device 120 has its IP phone capabilities. When the telecommunication device 120 is operating in the second operating mode it may not have full functionality and an explanation via the display device 224 will help the user know that communication is possible via the telecommunication device 120 even though the full functionality associated with an IP phone is not available.

When the network failure has been resolved (e.g., power has been restored or the switch is functioning properly), the telecommunication device 120 may switch back to the default operational mode. However, in the event that the telecommunication device 120 is being used, the switching member 208 may not switch the functionality of the telecommunication device 120 until the call has been completed. For example, a user may be using the analog component 216 to talk with another person via the circuit-switched network 108. If the analog component 216 were to be disconnected so that the digital component 212 could be reconnected, the call may be dropped. This may have very serious implications if the user was in middle of an emergency call. Thus, the switching member 208 will wait until the receiver of the telecommunication device 120 is back on hook until it transfers back to the digital component 212.

Figure 3:
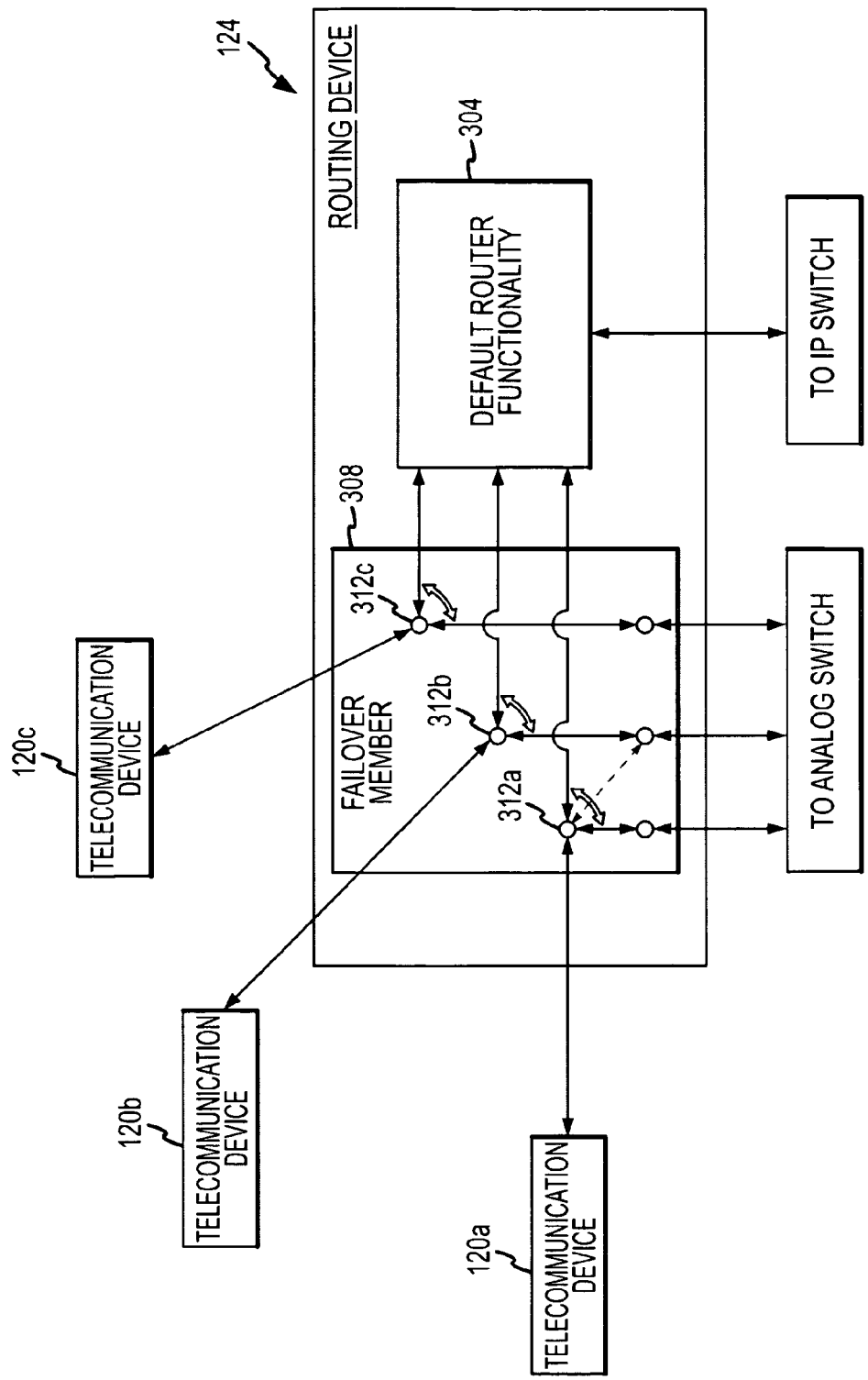
FIG. 3 is a block diagram depicting a routing device with enhanced capabilities in accordance with at least some embodiments of the present invention.

Referring now to FIG. 3 an exemplary routing device 124 will be described in accordance with at least some embodiments of the present invention. The routing device 124 may comprise a default routing device functionality 304 and a failover member 308 that comprises a number of switching nodes 312a-n, where n corresponds to the number of telecommunication devices 120 that are connected to the routing device 124, and where n≧1. In the first operational mode (e.g., the digital operational mode), the switching nodes 312a-n connect their respective telecommunication device 120 to the default routing device functionality 304. The default routing device functionality 304 connects the routing device 124 to the IP switch 128 such that communications via the packet-switched network 104 are possible. When a power outage or other type of network failure is detected, the failover member 308 switches the switching nodes 312 such that the telecommunication devices 120 are connected to the analog switch 132. This way, if the power supply 112 failed, then the telecommunication devices 120 may still receive power from power supply 116. Generally, only one analog line is connected between the circuit-switched network 108 and the routing device 124. Thus, the switching nodes 312 switch as shown in the dotted lines connecting to node 312a. The result is that all of the telecommunication devices 120 would be analog phones connected as a party line. When connected as a party line, only one call between all telecommunication devices 120 connected to a single routing device 124 could be possible.

In an alternative configuration, when a call is attempted, telecommunication devices 120 could select one of the multiple Ethernet cable wires connecting the telecommunication device(s) 120 to the routing device 124 according to a switch or a random setting, giving multiple party lines and increasing the number of calls possible. The routing device 124 and/or analog switch 132 could break out each line in the Ethernet line to dedicated analog lines, thus allowing all telecommunication devices 120 to be used if enough analog capacity is available.

Once the failure has been resolved, the switching nodes 312a-n may switch the connection back to the default routing device functionality 304. However, to ensure that no current calls are being cut-off, the routing device 124 may probe the telecommunication device 120 to determine if a line is currently in use. If the telecommunication device 120 is currently being used, the failover member 308 will wait to switch the respective switching node 312 connected to the active telecommunication device 120 until the call has been completed. In this embodiment, all of the enterprise communication and switching devices remain in the second operational mode until all active and/or outgoing calls involving the devices have been completed. In an alternative embodiment, the switch being used in the failover operational mode may hold the call and transfer it back to the telecommunication device once the default functionality of the telecommunication device 120 has been rebooted. In other words, the switch may hold the call until the telecommunication device 120 has switched back to using its digital component. Then the call is transferred back to the telecommunication device 120 so that the call may be completed.

Figure 4:
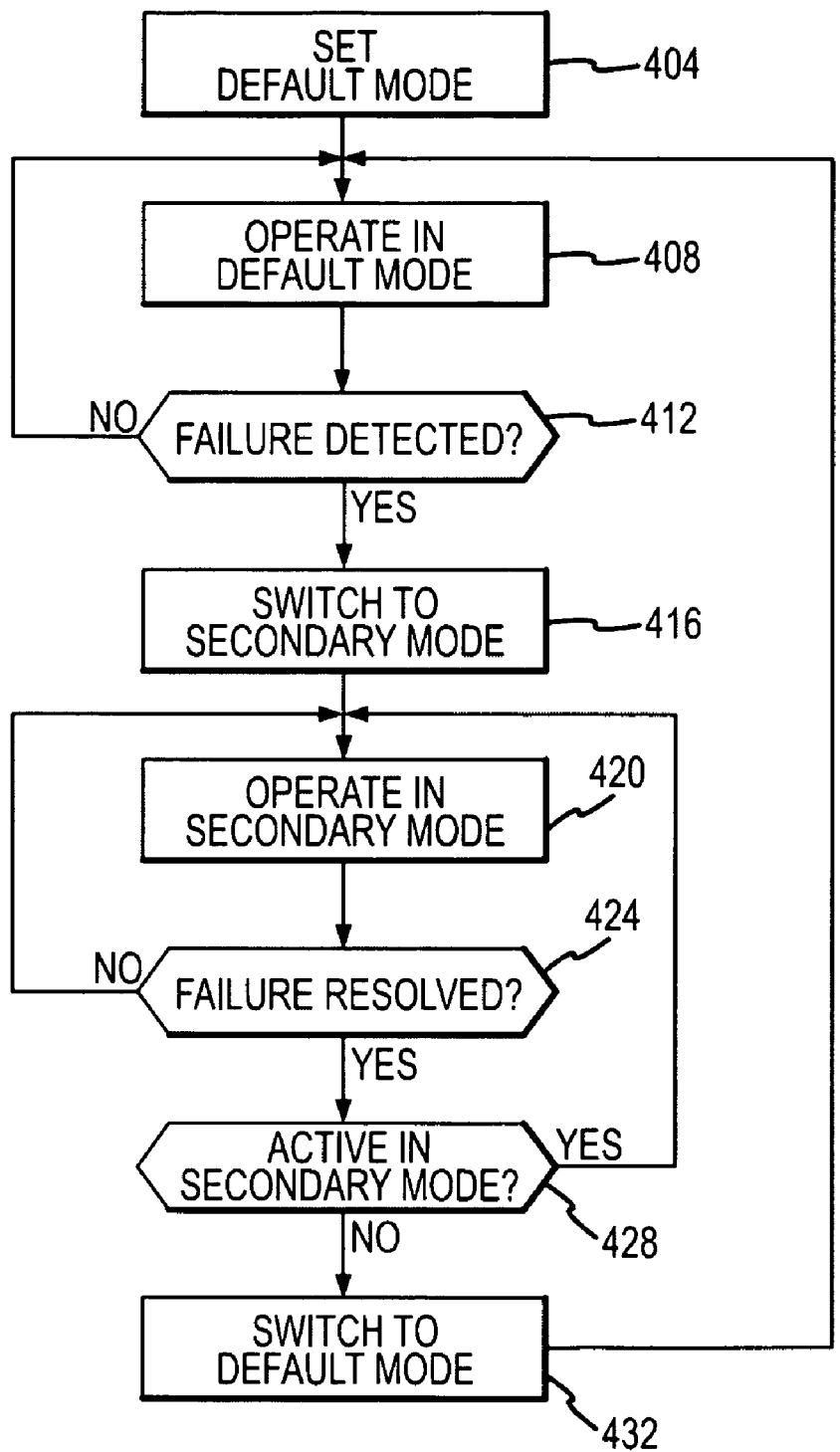
FIG. 4 is a flow chart depicting a method of operation for a telecommunication device and/or other network components in accordance with at least some embodiments of the present invention.

Referring now to FIG. 4, a method of operating an exemplary telecommunication device 120 and/or other network 100 components will be described in accordance with at least some embodiments of the present invention. Initially, in step 404, the default mode of the telecommunication device 120 is set. Usually, the default mode of the telecommunication device 120 is the digital operating mode where the telecommunication device 120 has IP phone functionality. This is typically the case because IP phones generally have more functionality than to traditional analog phones. Of course, the default mode may be set to some operational mode other than digital.

After the default mode has been set, the telecommunication device 120 and the devices connecting the telecommunication device 120 to the default communication network operate in the default mode (step 408). The telecommunication device 120 will continue to operate in the default mode until the first event occurs and is detected in step 412. If a first event does not occur, then the method will return to step 408 where the telecommunication device 120 continues to operate in the default or primary operational mode. However, if a first event is detected in step 412, then the telecommunication device 120 switches to its secondary operational mode (step 416).

The second operational mode may correspond to the telecommunication device 120 using its analog component 216. In the event that a power failure caused the operational modes to be switched, then the analog component 216 will receive power from the power supply 116 and may send messages across at least one line of an Ethernet cable attached to the interface 204. In step 420, the telecommunication device 120 continues to operate in the second operational mode until a second event occurs. The second event is commonly the removal of the first event or its consequences, such an event may include a resolution of the power supply failure, the resolution of the network failure, and/or a repair of the failed componentry in the telecommunication device 120.

In step 424, it is determined if the second event has occurred. If the failure has not been resolved, then the telecommunication device 120 continues to operate in the second operational mode in step 420. However, if the failure has been resolved, then it is determined if the telecommunication device 120 is active in the second operational mode (step 428). If the telecommunication device 120 is currently engaging in a call or is otherwise active in the second operational mode, then the method returns to step 420 and the telecommunication device 120 continues to operate in the second operational mode. Once it is determined that the telecommunication device 120 is no longer active in the second operational mode, then the default mode may be restored and the telecommunication device 120 may switch back to the default operational mode (step 432). Thereafter, the method returns to step 408 where the telecommunication device 120 is allowed to operate in the default operational mode.

When the telecommunication device 120 is operating in the second operational mode incoming circuit-switched calls are received in a normal fashion. Additionally, since the routing device 124 has also switched to the second operating mode incoming packet-switched calls may be received by the default router functionality 304 and be depacketized by the router 124 such that they can be sent to at least one telecommunication device 120 and be transmitted to a user of that device through the analog component 216 of the device 120.

In accordance with at least some embodiments of the present invention, when the telecommunication devices 120 switch to operate in the second operating analog mode, multiple telecommunication devices 120 are connected to a common outgoing line through the router 124. In this case, one of the multiple telecommunication devices 120 is designated as the default telecommunication device 120. Therefore, if any call is placed to one of the multiple telecommunication devices 120, then the call is sent to the default telecommunication device 120. Typically, the default telecommunication device 120 is a phone that is in a central location that can be easily accessed by users of the other telecommunication devices 120. This functionality provides a call back number for emergency services in the event of a network failure during an emergency call. Typically, when an IP phone calls an emergency service provider, the emergency service provider is given an ELIN that provides location information for the calling party. If the communication is lost during the emergency call, the emergency service provider attempts to call the telecommunication device 120 back. Typically, if the network failed (e.g., the power failed at the telecommunication device 120), the emergency service provider would not have been able to get a hold of the originating telecommunication device 120. Now, the emergency service provider can call the telecommunication device 120 back using the circuit-switched network 104 and the call can be processed at the router 124 and sent to either the originating telecommunication device 120 or the default telecommunication device 120 that is typically located within proximity of the originating telecommunication device 120.

The present invention, in various embodiments, includes components, methods, processes, systems and/or apparatus substantially as depicted and described herein, including various embodiments, subcombinations, and subsets thereof. Those of skill in the art will understand how to make and use the present invention after understanding the present disclosure. The present invention, in various embodiments, includes providing devices and processes in the absence of items not depicted and/or described herein or in various embodiments hereof, including in the absence of such items as may have been used in previous devices or processes, e.g., for improving performance, achieving ease and\or reducing cost of implementation.

The foregoing discussion of the invention has been presented for purposes of illustration and description. The foregoing is not intended to limit the invention to the form or forms disclosed herein. In the foregoing Detailed Description for example, various features of the invention are grouped together in one or more embodiments for the purpose of streamlining the disclosure. This method of disclosure is not to be interpreted as reflecting an intention that the claimed invention requires more features than are expressly recited in each claim. Rather, as the following claims reflect, inventive aspects lie in less than all features of a single foregoing disclosed embodiment. Thus, the following claims are hereby incorporated into this Detailed Description, with each claim standing on its own as a separate preferred embodiment of the invention.

Moreover though the description of the invention has included description of one or more embodiments and certain variations and modifications, other variations and modifications are within the scope of the invention, e.g., as may be within the skill and knowledge of those in the art, after understanding the present disclosure. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A method for maintaining communication abilities, comprising:
   connecting a first port of a telecommunication device to a packet-switched communication network;
   while the first port is connected to the packet-switched network, operating the telecommunication device in a first operational mode;
   detecting a first event;
   generating a message in response to detecting the first event;
   transmitting the message to a switching device in communication with the telecommunication device, wherein the switching device is responsible for switching the connection of the telecommunication device from the packet-switched network to a circuit-switched network; and
   upon receipt of the message, switching the connection of the telecommunication device such that the telecommunication device is in communication with the circuit-switched network by connecting the first port of the telecommunication device to a circuit-switched communication network; and
   while the first port is connected to the circuit-switched network, operating the telecommunication device in a second operational mode.

2. The method of claim 1, wherein power is provided to the telecommunication device via the first port in both the first operational mode and the second operational mode.

3. The method of claim 1, wherein the first event is a power failure.

4. The method of claim 1, wherein in the first operational mode the telecommunication device is powered by Power over Ethernet (PoE) and in the second operational mode the telecommunication device is powered by electricity received over a copper line that is connected to the first port.

5. The method of claim 1, wherein the first port is used as a signal communication path in both the first and second operational mode.

6. The method of claim 1, wherein voice communications are packetized and transmitted over the packet-switched network in the first operational mode, wherein voice communications are transmitted over the circuit-switched network in analog form in the second operational mode.

7. The method of claim 1, wherein while operating in the first operational mode the telecommunication device is not operating in the second operational mode and wherein while operating in the second operational mode the telecommunication device is not operating in the first operational mode.

8. The method of claim 1, wherein the first port comprises an Ethernet port connected to an Ethernet cable, wherein the Ethernet cable comprises a plurality of wires, the method further comprising:
 disconnecting a digital component of the telecommunication device from the Ethernet cable; and
 connecting an analog component of the telecommunication device to at least one of the plurality of wires in the Ethernet cable.

9. The method of claim 1, wherein the first event is a network failure.

10. The method of claim 1, further comprising:
 connecting a number of telecommunication devices to a common line in the second operational mode;
 determining one of the number of telecommunication devices to be a default telecommunication device; and
 sending an incoming call to any one of the number of telecommunication devices for the default telecommunication device.

11. The method of claim 10, wherein the incoming call is a circuit-switched call.

12. The method of claim 1, further comprising:
 determining if the telecommunication device is engaged in a call in the second operational mode;
 upon the occurrence of a second event, performing one of the following:
  (i) in the event that the telecommunication device is engaged in a call, allowing the telecommunication device to continue engaging in the call in the second operational mode; and
  (ii) in the event that the telecommunication device is not engaged in a call, reconnecting the first port to the packet-switched network and allowing the telecommunication device to operate in the first operational mode.

13. A device for use in a communication system, comprising:
 an interface for communicating with a first and second type of communication network, wherein the first type of communication network is a packet-switched network, and wherein the second type of communication network is a circuit-switched network;
 a first operational component for use during a first operational mode;
 a second operational component for use during a second operational mode;
 a switch; and
 wherein the first component is connected with the first type of communication network via the interface during the first operational mode, wherein the second component is connected with the second type of communication network via the interface during the second operational mode, wherein the first operational component comprises a digital component and a packetizer for packetizing calls to be transmitted over the packet-switched network, and wherein the second operational component comprises an analog component, wherein the first operational component is not employed in the second operational mode, wherein the second operational component is not employed in the first operational mode, wherein the interface comprises an Ethernet port connected to an Ethernet cable, wherein the Ethernet cable comprises a plurality of wires, wherein the switch disconnects the digital component from the Ethernet cable and connects the analog component to at least one of the plurality of wires of the Ethernet cable for operation in the second operational mode.

14. The device of claim 13, wherein power is provided to the first component via the interface in the first operational mode and power is provided to the second component via the interface in the second operational mode.

15. The device of claim 13, wherein the first operational component comprises a digital component and a packetizer for packetizing calls to be transmitted over the packet-switched network, and wherein the second operational component comprises an analog component, wherein the first operational component is not employed in the second operational mode and wherein the second operational component is not employed in the first operational mode.

16. The device of claim 13, wherein the second operational component is connected with the second type of communication network in response to the occurrence of a first event, and wherein the first event comprises a power failure.

17. The device of claim 13, wherein the interface is used as a signal communication path in both the first and second operational mode.

18. The device of claim 13, wherein in the first operational mode the telecommunication device is powered by Power over Ethernet (PoE) and in the second operational mode the telecommunication device is powered by electricity received over a copper line that is connected to the interface.

19. The device of claim 13, further comprising a network failure detection member, wherein the network failure detection member is operable to detect a network failure and in response to detecting the network failure to generate a message and cause the message to be transmitted to a switching device in communication with the telecommunication device that causes the switching device to switch the connection of the telecommunication device from the packet-switched network to the circuit-switched network.

20. A communication system, comprising:
 at least one telecommunication device that is configured to operate in a first operational mode and a second operational mode;
 a routing device comprising a failover member that is operable to connect a first port of the at least one telecommunication device to a first type of communication network during a first operational mode and is further operable to, upon the occurrence of a first event, connect the first port of the at least one telecommunication device to a second type of communication network during a second operational mode; and
 a signal communication path that provides communication between the at least one telecommunication device and the routing device, wherein the signal communication path is used by the at least one telecommunication device to communicate with the routing device in both the first and second operational modes, wherein the first type of communication network is a packet-switched network, wherein the second type of communication network is a circuit-switched network, wherein the at least one telecommunication device further comprises a switch, a digital component, and an analog component, wherein the signal communication path comprises an Ethernet port connected to an Ethernet cable, wherein the Ethernet cable comprises a plurality of wires, wherein the switch disconnects the digital component from the Ethernet cable and connects the analog component to at least one of the plurality of wires of the Ethernet cable for operation in the second operational mode.

21. The system of claim 20, wherein power is provided to the first component via the signal communication path in the first operational mode and power is provided to the second component via the signal communication path in the second operational mode.

22. The system of claim 20, wherein the first event is a power failure.

23. The system of claim 20, wherein in the first operational mode the telecommunication device is powered by Power over Ethernet (PoE) and in the second operational mode the telecommunication device is powered by electricity received over a copper line that is connected to the interface.

24. The system of claim 20, wherein the at least one telecommunication device further comprises a network failure detection member, wherein the network failure detection member is operable to detect a network failure and in response to detecting the network failure to generate a message and cause the message to be transmitted to the routing device that causes the routing device to switch the connection of the at least one telecommunication device from the packet-switched network to the circuit-switched network.

25. The system of claim 20, wherein the failover member is further operable to connect a number of telecommunication devices to a common circuit-switched line in the second operational mode causing one of the number of telecommunication devices to be a default telecommunication device, and wherein the routing device is operable to receive an incoming packet-switched call to any one of the number of telecommunication devices, depacketize the call and send the call to the default telecommunication device.

26. The system of claim 20, wherein, in response to a second event, the failover member is further operable to determine whether the telecommunication device is participating in a call in the second operational mode, in the event that the telecommunication device is participating in a call in the second operational mode the failover member is operable to allow the telecommunication device to continue participating in the call, and in the event that the telecommunication device is not participating in a call in the second operational mode the failover member is operable to reconnect the at least one telecommunication device to the packet-switched network.

* * * * *